US012530617B1

(12) United States Patent
Page et al.

(10) Patent No.: US 12,530,617 B1
(45) Date of Patent: Jan. 20, 2026

(54) TECHNIQUES FOR ORGANIZING COMPONENTS IN A COMPONENT MANAGEMENT SERVICE BASED ON GEOMETRY AND METADATA-BASED CLASSIFICATION

(71) Applicant: Bentley Systems, Incorporated, Exton, PA (US)

(72) Inventors: Kaustubh Page, Bee Cave, TX (US); Karl-Alexandre Jahjah, Quebec (CA)

(73) Assignee: Bentley Systems, Incorporated, Exton, PA (US)

( * ) Notice: Subject to any disclaimer, the term of this patent is extended or adjusted under 35 U.S.C. 154(b) by 952 days.

(21) Appl. No.: 17/720,718

(22) Filed: Apr. 14, 2022

(51) Int. Cl.
*G06F 30/20* (2020.01)
*G06F 9/451* (2018.01)
(Continued)

(52) U.S. Cl.
CPC ............. *G06N 20/00* (2019.01); *G06F 9/451* (2018.02); *G06F 16/383* (2019.01); *G06F 18/22* (2023.01); *G06F 30/20* (2020.01)

(58) Field of Classification Search
CPC ....... G06N 20/00; G06F 9/451; G06F 16/383; G06F 30/20; G06F 18/22
See application file for complete search history.

(56) References Cited

U.S. PATENT DOCUMENTS

| 8,429,174 | B2 * | 4/2013 | Ramani | G06V 20/64 |
| | | | | 345/473 |
| 11,392,736 | B2 * | 7/2022 | Austern | G06N 20/00 |

(Continued)

OTHER PUBLICATIONS

"Introduction to Components Center," Bentley Systems, Incorporated, Retrieved from the Internet: < https://docs.bentley.com/LiveContent/web/AECOsim Building Designer Help-v2/en/GUID-CCDE2FF6-C63E-4876-B3AE-5F2B33EF8547.html >, Aug. 18, 2017, pp. 1-2.

(Continued)

*Primary Examiner* — Beau D Spratt
(74) *Attorney, Agent, or Firm* — Cesari and McKenna, LLP; James A. Blanchette (57) ABSTRACT

In example embodiments, a component management service identifies related components using a combination of ML model geometry-based classification and text-based classification. The component management service accesses a plurality of components, wherein each component is associated with a geometry mesh and textual metadata. It classifies each component based on geometric similarity by providing the geometry mesh as input to one or more ML models. A geometry classification confidence score is produced for each classification. The component management service also classifies each component based on textual similarity by providing the textual metadata as input to the one or more ML models. A textual classification confidence score is produced for each classification. It calculates an overall confidence score for each classification by combining the geometry classification confidence score and the textual metadata classification confidence score. It displays components together that have an overall confidence score that exceeds a threshold for a same classification.

20 Claims, 5 Drawing Sheets

(51) Int. Cl.
    *G06F 16/383*     (2019.01)
    *G06F 18/22*     (2023.01)
    *G06N 20/00*     (2019.01)

(56) References Cited

U.S. PATENT DOCUMENTS

| | | | |
|---|---|---|---|
| 2020/0410116 A1* | 12/2020 | Williamson | G06N 20/00 |
| 2021/0117716 A1* | 4/2021 | Lapointe | G06T 19/00 |
| 2022/0043547 A1 | 2/2022 | Jahjah et al. | |
| 2022/0044146 A1 | 2/2022 | Gardner et al. | |
| 2022/0121886 A1* | 4/2022 | Jahjah | G06F 18/24155 |
| 2024/0127432 A1* | 4/2024 | Groth | G06V 10/82 |

OTHER PUBLICATIONS

"ProjectWise® Components Center: Manage, Share, and Access Digital Components Faster," Product Data Sheet, Bentley Systems, Incorporated, Jul. 2019, pp. 1-2.

U.S. Appl. No. 17/034,844, filed Sep. 28, 2020 by Marc-André Lapointe et al. for Classifying Individual Elements of an Infrastructure Model, pp. 1-27.

U.S. Appl. No. 17/075,412, filed Oct. 20, 2020 by Karl-Alexandre Jahjah et al. for Automatic Identification of Misclassified Elements of an Infrastructure Model, pp. 1-46.

U.S. Appl. No. 17/314,735, filed May 7, 2021 by Louis-Philippe Asselin et al. for Classifying Elements and Predicting Properties in an Infrastructure Model Through Prototype Networks and Weakly Supervised Learning, pp. 1-40.

* cited by examiner

TECHNIQUES FOR ORGANIZING COMPONENTS IN A COMPONENT MANAGEMENT SERVICE BASED ON GEOMETRY AND METADATA-BASED CLASSIFICATION

BACKGROUND

Technical Field

The present disclosure relates generally to infrastructure modeling, and more specifically to techniques for organizing components in a component management service.

Background Information

In the design, construction and/or operation of infrastructure (e.g., buildings, factories, roads, railways, bridges, electrical and communication networks, equipment, etc.) it is often desirable to create infrastructure models. An infrastructure model may maintain a built infrastructure model (BIM) or digital twin of infrastructure. A BIM is a digital representation of infrastructure as it should be built, providing a mechanism for visualization and collaboration. A digital twin is a digital representation of infrastructure as it is actually built, and is often synchronized with information representing current status, working condition, position, and/or other qualities.

An infrastructure model (e.g., a BIM or digital twin) is typically constructed from a number of digital components. As used herein the term "digital component" (or simply "component") refers to an entity that represents (i.e., "models," in a colloquial sense of the term) a part or portion of a larger whole. Depending on the type of infrastructure being modeled, the specific nature of the part or portion may vary. For example, if the infrastructure being modeled is a building, it may be a truss, column, door, window or other part or portion of the building. Similarly, if the infrastructure being modeled is an electrical network, it may be a switch, transformer, distribution panel, disconnect, breaker, or other part or portion of the electrical network. Components are often maintained in a design file structured according to a standardized file format (e.g., DGN, DWG, DXF, etc.). The design file typically includes both geometry data (e.g., describing a two-dimensional (2D) or three-dimensional (3D) arrangement of elements that make up the component) and textual metadata (e.g., indicating a component identifier (ID), timestamp, name, description, category, application, manufacturer, tag, etc.)

The number of different components used by organizations in their infrastructure models is ever-growing. Many organizations create themselves or obtain from vendors (e.g., via subscriptions) large libraries or content packs of components. Individual design teams at such organizations may also create custom components that are suited for their particular projects. To manage all these components, organizations may use a component management service (e.g., a cloud-based component management service). Such component management service may enable standardized access to a collection of components, while ensuring that the components and their associated data persist across the entire infrastructure lifecycle.

However, some issues have been identified with existing component management services. One issue is related to the organization of components to enable user to quickly find a suitable component for their project. Each library or content pack may utilize its own conventions for assigning textual metadata such as names, descriptions, categories, applications, manufacturers, tags, etc. Further, individual design teams may use their own conventions, or may lack comprehensive conventions, when assigning metadata to components they create, resulting in inconsistent or incomplete metadata. As such, while there may be effective organization within a particular library or content pack, there is often not effective organization across the entire collection of components available via the component management service.

To attempt to assist users in finding suitable components, component management services often provide for keyword searching on the metadata of components (e.g., on the tag). However, since the components are often not effectively organized and have inconsistent or incomplete metadata, such searching may miss relevant components. For example, keyword searching may return one component that happens to use a particular tag but may miss another relevant component simply because it lacks that particular tag. In some cases, users may be forced to repeatedly search with different keywords, or to manually page through component libraries and content packs, to find a suitable component (wasting considerable time).

Accordingly, there is a need for improved techniques for organizing components in a component management service to enable quicker search and selection of suitable components.

SUMMARY

In example embodiments, a component management service (e.g., a cloud-based component management service) organizes components by identifying related components using a combination of machine-learning (ML) model geometry-based classification and text-based classification. The resulting classifications may group related components spanning across libraries, content packs and project team boundaries, enabling additional relevant components to be returned in a search. The use of geometry-based classification may address issues of inconsistent or incomplete metadata that have hindered keyword searching.

In one example embodiment, a component management service identifies related components using a combination of ML model geometry-based classification and text-based classification. The component management service accesses a plurality of components usable in infrastructure models, wherein each component is associated with a geometry mesh and textual metadata. It classifies each component of the plurality of components based on geometric similarity by providing the geometry mesh of each component as input to one or more ML models. A geometry classification confidence score is produced for each classification. The component management service also classifies each component of the plurality of components based on textual similarity by providing the textual metadata of each component as input to one or more ML models. A textual classification confidence score is produced for each classification. The component management service calculates an overall confidence score for each classification by combining the geometry classification confidence score and the textual metadata classification confidence score for each classification. It then displays components together in its user interface that have an overall confidence score that exceeds a threshold for a same classification.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
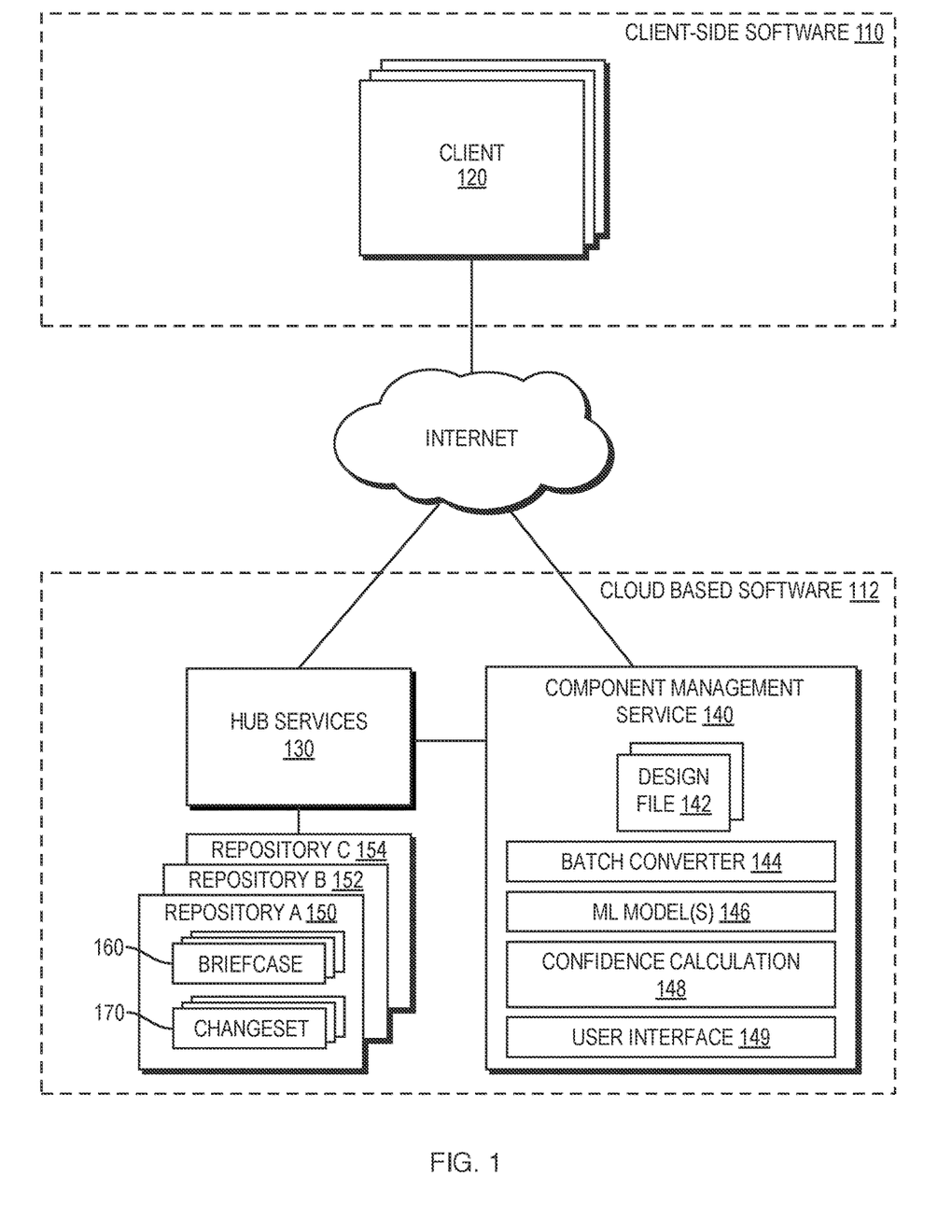
FIG. 1 is a high-level block diagram an example software architecture that includes a component management service that organizes components by identifying related components using a combination of ML model geometry-based classification and text-based classification.

FIG. 1 is a high-level block diagram an example software architecture that includes a component management service that organizes components by identifying related components using a combination of ML model geometry-based classification and text-based classification. The architecture may be divided into client-side software 110 executing on one or more computing devices arranged locally (collectively "client devices") and cloud-based software 112 executing on one or more remote computing devices ("cloud computing devices") accessible over the Internet.

The client-side software 110 may include client software applications (or simply "clients") 120 operated by users. The clients 120 may be of various types, including desktop clients that operate directly under an operating system of a client device and web clients that operate within a web browser. The clients 120 may handle a number of operations (e.g., often non-processing intensive operations), for example, providing user interfaces that supply input to and display information received from the cloud-based software 112.

The cloud-based software 112 may include hub services software 130 that maintains infrastructure models (e.g., BIMs or digital twins) as well as a variety of services software, including a component management service 140 that organizes and makes components available for use in such infrastructure models.

In one implementation, the hub services 130 maintains the infrastructure models utilizing briefcases and changesets to enable multiple versions and concurrent operation. A briefcase is a particular instance of a database that represents a materialized view of information for a specific version. Initially an "empty" baseline briefcase may be created. Over time the baseline briefcase may be modified with changesets, which are persistent electronic records that capture changes needed to transform a particular instance from one version to a new version. Hub services 130 may maintain briefcases 160 and accepted changesets 170 in a repository 150-154. When there is need of an infrastructure model, it may obtain the briefcase 160 from a repository 150-154 closest to the desired state (e.g., the current state) and those accepted changesets 160 from a repository 150-154 that when applied bring that briefcase up to the desired state. To avoid the need to constantly access the repository 150-154, a client may also maintain a local copy (not shown), that is periodically synchronized with the information maintained in a repository 150-154.

In one implementation the component management service 140 is the cloud based Projectwise® component center available from Bentley Systems, Inc. of Exton PA. The component management service 140 may provide a common, centralized source of components to project teams distributed across an organization. The collection of components may include components from commercial libraries and content packs, as well as custom components created by individual project teams for their particular projects. The component management service 140 may maintain each component in a design file 142 structured according to a design file format (e.g., DGN, DWG, DXF, etc. file format) which includes geometry data (e.g., describing a 2D or 3D arrangement of elements that make up the component) and textual metadata (e.g., a component ID, timestamp, name, description, category, application, manufacturer, tag, etc.). Each component may also be linked to associated file-based information (not shown), including specifications, drawings, data sheets and the like. The component management service 140 may maintain the textual metadata and the associated file-based information throughout the lifecycle of infrastructure.

The component management service 140 may organize components by identifying related components using a combination of ML model geometry-based classification and text-based classification. The resulting classifications may group related components spanning across libraries, content packs and project team boundaries, enabling additional relevant components to be returned in a search. To that end, the component management service 140 may include a batch converter 144, one or more ML models 146, a confidence calculation module 148, and a user interface module 149. The batch converter 144 may extract geometry of components from their design files and convert it to geometry meshes, and extract textual metadata from design files and/or other sources and store it as embeddings (i.e., numerical vector representations of the information) or text strings. The one or more ML models 144 may use the geometry meshes to classify components based on their geometric similarity and the embeddings or text strings to classify components based on textual similarity, producing respective predictions associated with individual confidence scores. The confidence calculation module 148 may weight and combine the individual confidence scores and produce an overall confidence score for each classification. The user interface module 149 displays components based on their classifications and overall confidence scores to present related components together to a user, for example, in response to a user's search, enabling them to easily select suitable components.

Figure 2:
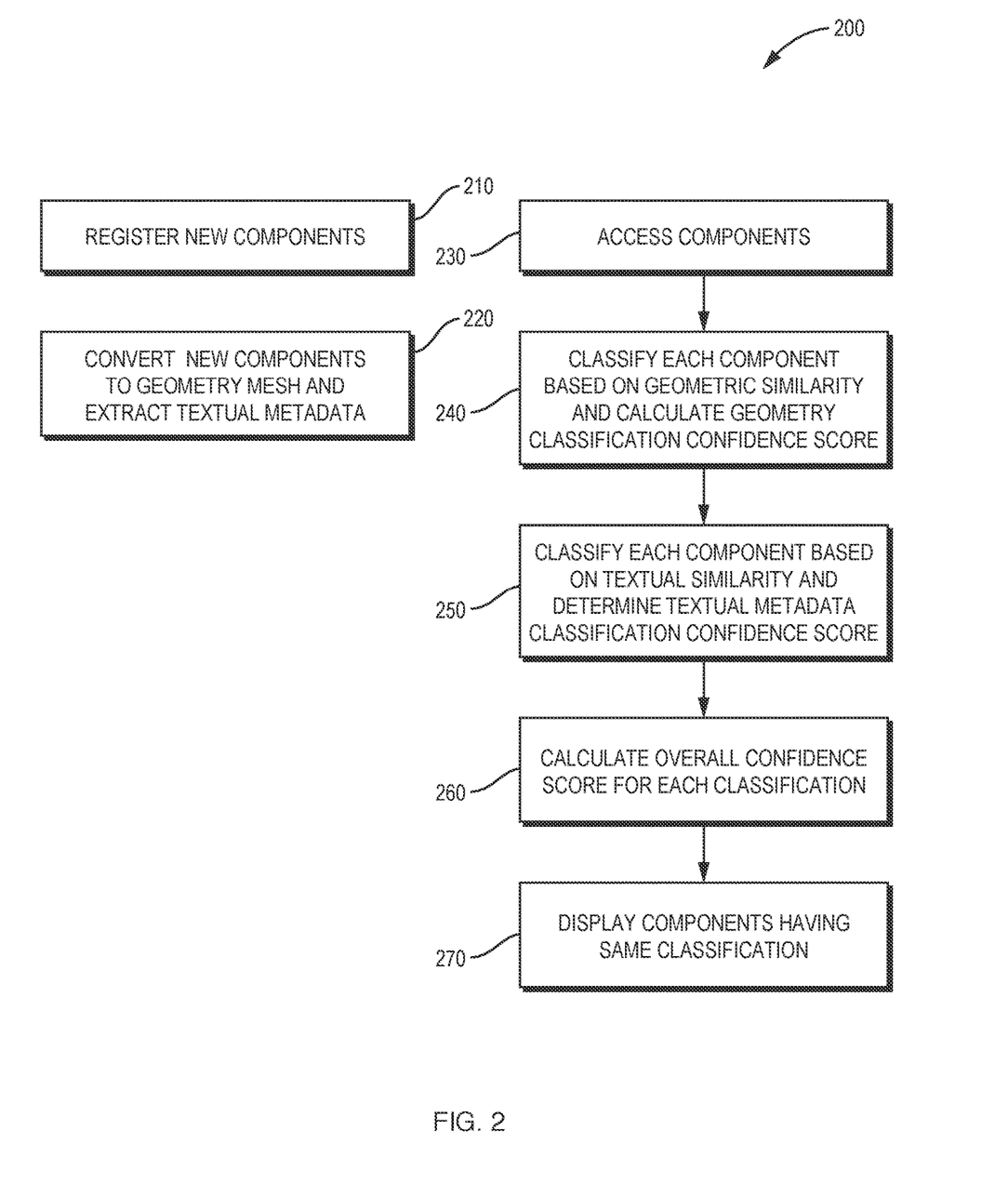
FIG. 2 is a flow diagram of an example sequence of steps for organizing components by identifying related components using a combination of ML model geometry-based classification and text-based classification.

FIG. 2 is a flow diagram of an example sequence of steps for organizing components by identifying related components using a combination of ML model geometry-based classification and text-based classification. At step 210, which may occur asynchronous to steps 230-270 of FIG. 2, new components are registered and added to the collection of components maintained by the component management service 140. Registering a component may involve using a client 120 to import a design file 142 (e.g., a DGN, DWG, DXF, etc. file) which may already include certain textual metadata (e.g., component ID, timestamp, etc.), as well as providing additional textual metadata (e.g., name, description, category, application, manufacturer, tag, etc.) in a user interface of the client 120 (e.g., via text entry boxes).

At step 220, the batch converter 144 of the component management service 140 may periodically (e.g., based on a predefined time interval) or responsively (e.g., based on a number of unprocessed components or other responsive trigger) convert the design file 142 to a geometry mesh and extract textual metadata to produce an embedding or text string. Step 220 may occur sequentially to step 210 or may occur in parallel to 210. The conversion may extract geometric information describing vertices and faces from each design file 142 in the batch and build a geometry mesh (e.g., a 2D or 3D mesh) having the vertices and faces. The extracting may involve collecting the textual metadata in each design file 142 in the batch, and collecting additional textual metadata provided in the user interface. In some cases, the extracting may also involve collecting metadata maintained by the component management service 140 separate from the individual components and their design files 142, for example, category metadata maintained in connection with a component library or content pack to which a design file belongs.

At step 230, the component management service 140 access components of the collection.

Figure 3:
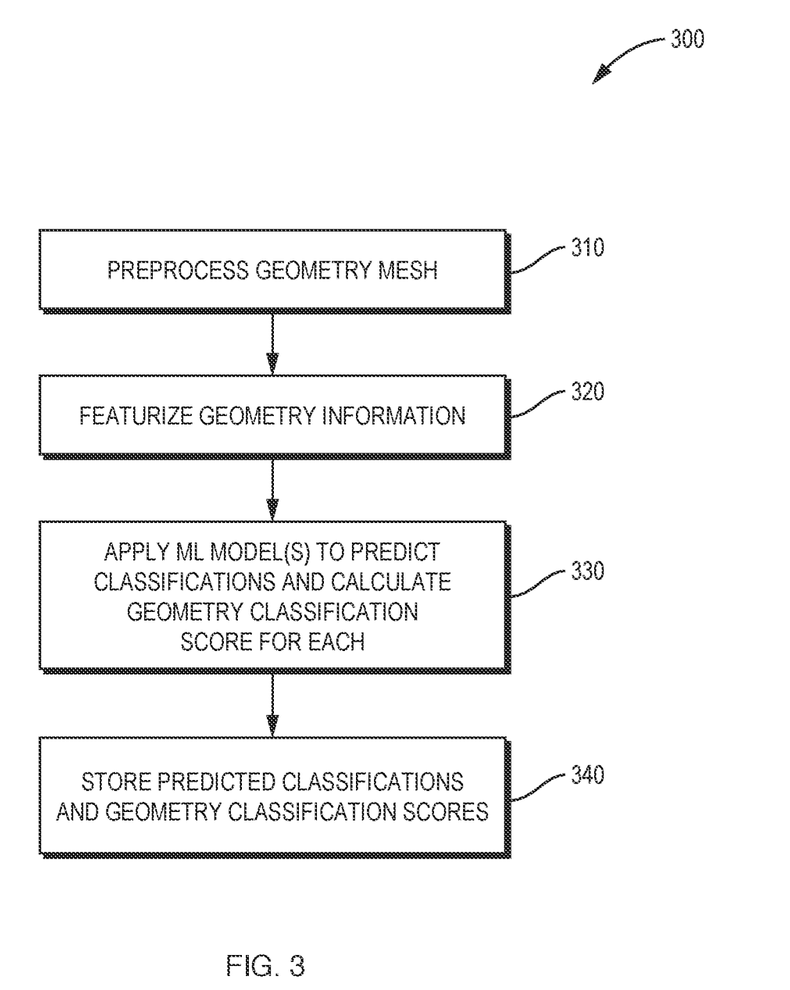
FIG. 3 is a flow diagram of an example sequence of steps that may be performed by the component management service to use one or more ML models to classify components based on geometry.

At step 240, the component management service 140 classifies components based on geometric similarity by providing the geometry mesh of each component as input to one or more ML models 144. Such classification may be performed in a number of different ways. FIG. 3 is a flow diagram of an example sequence of steps 300 that may be performed as part of step 240 by the component management service 140 to use one or more ML models 144 to classify components based on geometry. The sequence of step 300 may assume the ML model 144 has already been trained, using appropriate training techniques.

At step 310, the component management service 140 may preprocess the geometry mesh of each component. The preprocessing may include cleaning the mesh to transform it into a manifold mesh, which may involve re-winding one or more faces of the mesh, adding one or more additional faces to the mesh to fill holes, and/or re-triangulating one or more faces of the mesh, among other operations. In some implementations, the preprocessed data may be stored in a file or other data store (e.g., to avoid repeating preprocessing in future geometry-based classification involving the same component).

At step 320, the component management service 140 may featurize geometry information by building a vector of features that acts as descriptors for each component. The vector of features may be built by analyzing the manifold mesh and extracting information such as volume, surface area, length, width, height, and the like. In some cases, machine learning models may be used to build the vector of features. For example, points on the surface of the manifold mesh may be sampled to create a point cloud and a graph neural network model used to extract features from the point cloud. Likewise, the manifold mesh itself may be consumed directly by a graph neural network model to generate the vector of features.

At step 330, the component management service 140 may apply one or more ML models 144 to predict classifications of components based on their respective vector of features, and to calculate a geometry classification confidence score for each such prediction. The one or more ML models may include a Random Forest model, a Gradient Boosting Tree, a Support Vector Classifier, a Naive Bayes Classifier, a K-Nearest-Neighbours Classifier, a Recursive Feature Elimination with Cross-Validation model, a Term-Frequency Inverse-Document-Frequency model, a Multiple Instance Learning model, a Point-Net model, a Point-Net++ model or other known machine learning model. In some embodiments, as part of step 330, the component management service 140 may utilize multiple instance learning to leverage hierarchical information present in the collection of components to refine classifications. For example, a ML model 144 may assume that components already grouped together (e.g., in a same category, content pack, catalog, library, etc.) have a higher likelihood of belonging to the same classification than components that are not already grouped together, and classifications may be adjusted based thereupon.

At step 340, the component management service 140 stores the predicted classifications and confidence scores in association with component ID for each of the components. These results may be stored in a file or other data store.

Further details of this sort of geometry-based classification may be found in U.S. patent application Ser. No. 17/034,844, titled "Classifying Individual Elements of an Infrastructure Model", filed on Sep. 28, 2020, which is hereby incorporated by reference in its entirety. It should be understood that other types of geometry-based classification may alternatively be utilized, for example, geometry-based classification that uses prototype networks and weakly supervised learning. Further details of such an alternative approach may be found in U.S. patent application Ser. No. 17/314,735, titled "Classifying Elements and Predicting Properties in an Infrastructure Model Through Prototype Networks and Weakly Supervised Learning", filed May 7, 2021, which is also hereby incorporated by reference in its entirety.

Figure 4:
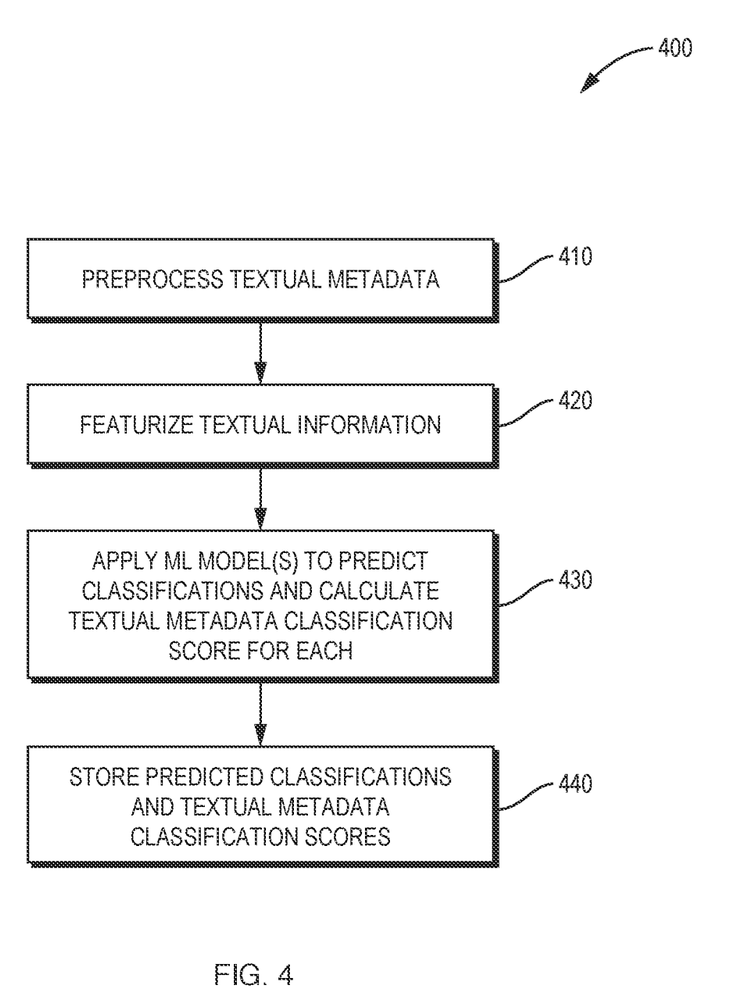
FIG. 4 is a flow diagram of an example sequence of steps that may be performed by the component management service to use one or more ML model to classify component based on textual metadata.

At step 250, the component management service 140 may classify components based on textual similarity by providing the embedding or text string embodying the textual metadata of each component to one or more ML models 144. Such classification may be performed in a number of different ways. FIG. 4 is a flow diagram of an example sequence of steps 400 that may be performed as part of step 250 by the component management service 140 to use one or more ML model 144 to classify component based on textual metadata. The sequence of step 400 may assume the ML model 144 has already been trained, using appropriate training techniques.

At step 410, the component management service 140 may preprocess the embedding or text string embodying the textual metadata of each component. The preprocessing may include standardizing or normalizing the information. In some implementations, the preprocessed data may be stored in a file or other data store (e.g., to avoid repeating preprocessing in future textual metadata-based classification involving the component).

At step 420, the component management service 140 may featurize textual information by building a vector of features that act as descriptors for each component. The vector of features may be built by analyzing and extracting information such as word lengths, sentiments, presence of named-entities, frequencies, and the like. In some cases, machine learning models may be used to build the vector of features. For example, recurrent neural network models, long shortterm memory units, transformers, and/or other machine learning structures may be used.

At step 430, the component management service 140 may apply one or more ML models 144 to predict classifications of components based on their respective vector of features and to calculate a textual metadata classification confidence score for each such prediction. Again, the one or more ML models may include various known machine learning models. In some embodiments, as part of step 430, the component management service 140 may utilize multiple-instance learning.

At step 440, the component management service 140 may store the predicted classification labels and confidence scores for the textual metadata-based predictions in association with component ID for each of the components. These results may be stored in a file or other data store.

At step 260, the confidence calculation module 148 of the component management service 140 may calculate an overall confidence score for each predicted classification by combining the prediction's geometry classification confidence score and its textual metadata classification confidence score. In one embodiment, the combination may involve calculating a weighted sum, given as:

$$\text{Confidence}_{Overall} = \text{Weight}_{Geo} * \text{Confidence}_{Geo} + \text{Weight}_{Text} * \text{Confidence}_{Text}$$

where $\text{Confidence}_{Overall}$ is the overall confidence score, $\text{Weight}_{Geo}$ and $\text{Weight}_{Text}$ are selected (e.g., user-selected) weights for geometry-based classification and textual-based classification, respectively, and $\text{Confidence}_{Geo}$ and $\text{Confidence}_{Text}$ are the geometry classification confidence score and the textual metadata classification confidence score, respectively. The selected weights may be customized by organization, by project team within an organization, or at another level of granularity.

At step 270, the user interface module 149 of the component management service 140 may display components (e.g., grouped together) that have an overall confidence score that exceeds a threshold for a same classification. The threshold may be a predetermined value or may be user-selectable (e.g., to permit users to see only components that are very probably similar or to also see more-speculatively similar components). In one implementation, the display may be in response to a search (e.g., a key-word search) on the collection of components maintained by the component management service 140. When one component is found in the search other components that share the same classification (with an overall confidence score that exceeds the threshold) may be presented proximate thereto (e.g., in a same section, in a same window, or in another type of visual or semantic proximity) in a user interface on a client 120. In this manner, the user interface module 149 may present related components together to a user, to enable them to more easily select suitable components spanning across libraries, content packs and project team boundaries.

Figure 5:
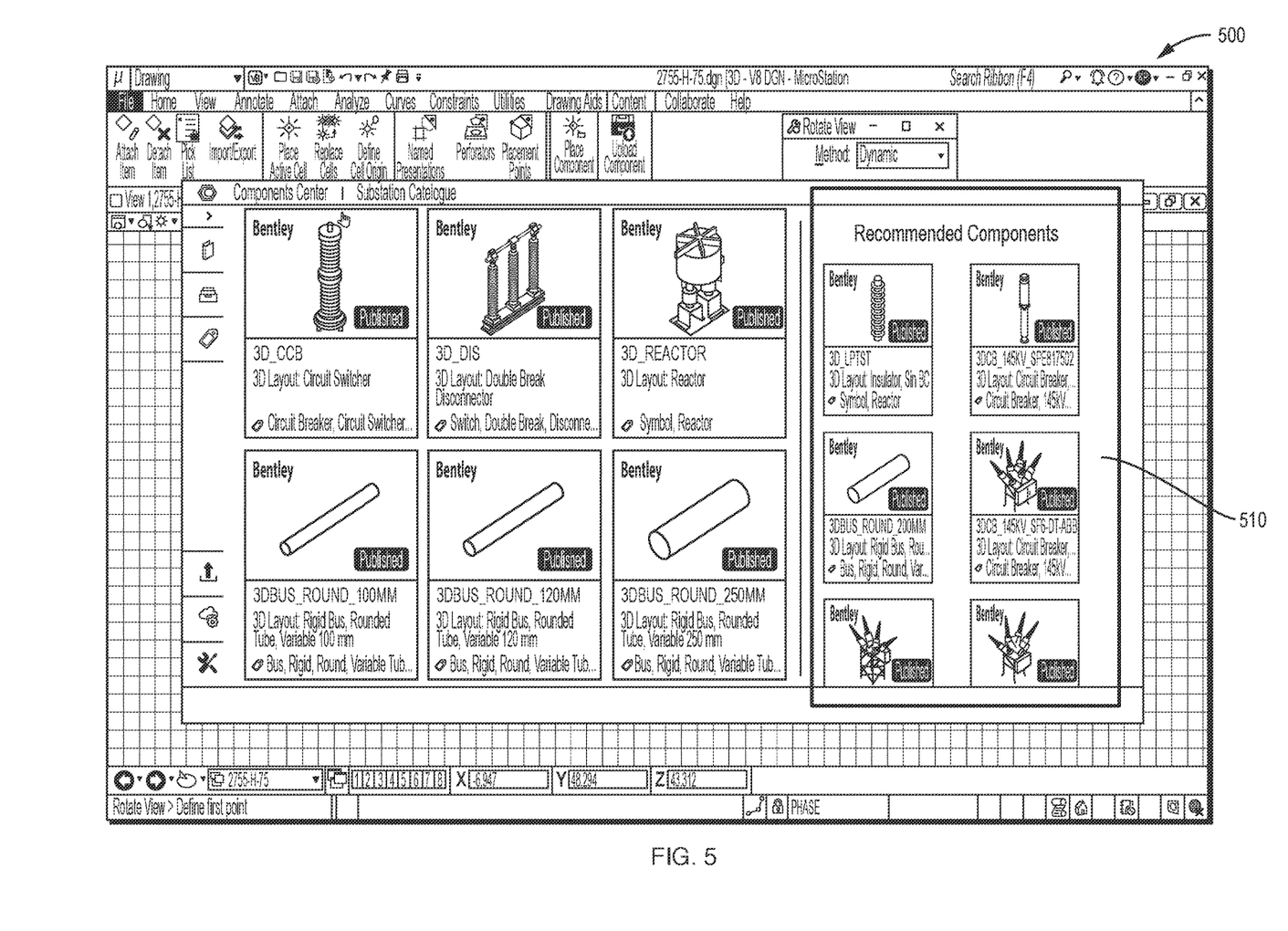
FIG. 5 is a screenshot of an example user interface of the component management service that may be displayed by a client to present related components together to a user.

FIG. 5 is a screenshot of an example user interface 500 of the component management service 140 that may be displayed by a client 120 to present related components together to a user. Components 510 may be displayed in a same section (in this example, a section titled "Recommended Components"). Such components may be distinguished from other unrelated components (in this example, in the remainder of the "Substation Catalog") to enable a user to rapidly select components.

It should be understood that a wide variety of adaptations and modifications may be made to these techniques. In general, functionality may be implemented using different software, hardware, and various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above description is meant to be taken only by way of example.

What is claimed is:

1. A method for generating a user interface for modeling infrastructure that presents related components usable in an infrastructure model proximate to each other, comprising:

accessing, by a component management service executing on one or more computing devices, a plurality of components usable in the infrastructure model that each model a portion of the infrastructure, wherein each component is associated with a geometry mesh and textual metadata;

classifying each component of the plurality of components based on geometric similarity by, for the geometry mesh of each component, cleaning the geometry mesh, extracting features from the cleaned geometry mesh to produce a first vector of features, comparing the first vector of features to features of components already grouped together, and predicting a classification and geometry classification confidence score;

classifying each component of the plurality of components based on textual similarity by, for the textual metadata of each component, normalizing the textual metadata, extracting features from the normalized textual metadata to produce a second vector of features, and based on the second vector of features predicting a classification and a textual metadata classification confidence score;

calculating, by the component management service, an overall confidence score for each classification based on the geometry classification confidence score and the textual metadata classification confidence score for each classification;

receiving, by the component management service, a key-word entered by a user;

searching the plurality of components usable in the infrastructure model to locate a first component that is responsive to the key-word;

displaying the first component in the user interface of the component management service; and displaying one or more other components proximate to the first component in the user interface of the component management service that have an overall confidence score that exceeds a threshold for a same classification as the first component.

2. The method of claim 1, further comprising:

converting a design file associated with the component to produce the geometry mesh of each component.

3. The method of claim 2, wherein the converting further comprises:

extracting the textual metadata of the component at least in part from the design file.

4. The method of claim 2, wherein the converting is performed as a batch process periodically or in response to a trigger.

5. The method of claim 1, wherein the classifying based on geometric similarity further comprises:
applying one or more ML models to predict classifications of each component based on their respective vector of features and to calculate the geometry classification confidence score of each predicted classification; and
storing the predicted classifications and geometry classification confidence scores in association with a component identifier (ID) of each of the components.

6. The method of claim 5, wherein the one or more ML models include at least one of a Random Forest model, a Gradient Boosting Tree, a Support Vector Classifier, a Naive Bayes Classifier, a K-Nearest-Neighbours Classifier, a Recursive Feature Elimination with Cross-Validation model, a Term-Frequency Inverse-Document-Frequency model, a Multiple Instance Learning model, a Point-Net model, or a Point-Net++ model.

7. The method of claim 1, wherein the classifying based on textual similarity further comprises:
applying one or more ML models to predict classifications of each component based on their respective vector of features and to calculate the textual metadata classification confidence score of each predicted classification; and
storing the predicted classifications and textual metadata classification confidence scores in association with a component identifier (ID) of each of the components.

8. The method of claim 1, wherein the calculating the overall confidence score further comprises:
determining a weighted average of the geometry classification confidence score and the textual metadata classification confidence score for each classification.

9. The method of claim 1, wherein the one or more other components are proximate to the first component by being within a same section or within a same window of the user interface of the component management service.

10. A computing device configured to generate a user interface for modeling infrastructure that presents related components usable in an infrastructure model proximate to each other, comprising:
a processor; and
a memory coupled to the processor and configured to store a component management service that is executable on the processor, the component management service comprising:
a first ML model configured to classify each component of a plurality of components that each model a portion of the infrastructure by, for each component, extracting features from a geometry mesh of the respective component to produce a first vector of features, comparing the first vector of features to features of components already grouped together, and predicting a classification and a geometry classification confidence score;
a second ML model configured to classify each component of the plurality of components by, for each component, extracting features from textual metadata associated with the respective component to produce a second vector of features, and based on the second vector of features predicting a classification and a textual metadata classification confidence score;
a confidence calculation module configured to calculate an overall confidence score for each classification based on the geometry classification confidence score and the textual metadata classification confidence score for each classification; and
a user interface module configured to receive a key-word entered by a user, cause a search of the plurality of components usable in the infrastructure model to locate a first component that is responsive to the key-word, display the first component in the user interface, and display one or more other components proximate to the first component in the user interface that have an overall confidence score that exceeds a threshold for a same classification as the first component.

11. The computing device of claim 10, wherein the user interface module further comprises:
a batch converter configured to convert a design file associated with each of a plurality of components to produce the geometry mesh of each component.

12. A non-transitory electronic device readable medium storing instructions that when executed on one or more processors of one or more computing devices are operable to:
access a plurality of components usable in an infrastructure model that each model a portion of infrastructure, wherein each component is associated with a geometry mesh and textual metadata;
classify each component of the plurality of components based on geometric similarity by, for the geometry mesh of each component, cleaning the geometry mesh, extracting features from the cleaned geometry mesh to produce a first vector of features, comparing the first vector of features to features of components already grouped together, and predicting a classification and a geometry classification confidence score;
classify each component of the plurality of components based on textual similarity by, for the textual metadata of each component, normalizing the textual metadata, extracting features from the normalized textual metadata to produce a second vector of features, and based on the second vector of features predicting a classification and a textual metadata classification confidence score;
calculate an overall confidence score for each classification based on the geometry classification confidence score and the textual metadata classification confidence score for each classification;
receive a key-word entered by a user;
search the plurality of components usable in the infrastructure model to locate a first component that is responsive to the key-word;
display the first component in a user interface; and
display one or more other components grouped together with the first component in the user interface that have an overall confidence score that exceeds a threshold for a same classification as the first component.

13. The non-transitory electronic device readable medium of claim 12, further comprising instructions that when executed are operable to:
convert a design file associated with each of the plurality of components to produce the geometry mesh of each component.

14. The non-transitory electronic device readable medium of claim 13, further comprising instructions that when executed are operable to:
extract the textual metadata of each component at least in part from the design file.

15. The non-transitory electronic device readable medium of claim 13, where in the conversion to the design file is performed as a batch process periodically or in response to a trigger.

16. The non-transitory electronic device readable medium of claim 12, further comprising instructions that when executed are operable to:
- apply one or more ML models to predict classifications of each component based on their respective vector of features and to calculate the geometry classification confidence score of each predicted classification; and
- store the predicted classifications and geometry classification confidence scores in association with a component identifier (ID) of each of the components.

17. The non-transitory electronic device readable medium of claim 16, wherein the one or more ML models include at least one of a Random Forest model, a Gradient Boosting Tree, a Support Vector Classifier, a Naive Bayes Classifier, a K-Nearest-Neighbours Classifier, a Recursive Feature Elimination with Cross-Validation model, a Term-Frequency Inverse-Document-Frequency model, a Multiple Instance Learning model, a Point-Net model, or a Point-Net++ model.

18. The non-transitory electronic device readable medium of claim 12, further comprising instructions that when executed are operable to:
- apply one or more ML models to predict classifications of each component based on their respective vector of features and to calculate the textual metadata classification confidence score of each predicted classification; and
- store the predicted classifications and textual metadata classification confidence scores in association with a component identifier (ID) of each of the components.

19. The non-transitory electronic device readable medium of claim 12, further comprising instructions that when executed are operable to:
- determine a weighted average of the geometry classification confidence score and the textual metadata classification confidence score for each classification.

20. The non-transitory electronic device readable medium of claim 12, wherein the one or more other components are grouped together with the first component by being within a same section or within a same window of the user interface.

* * * * *